United States Patent [19]
Hill et al.

[11] Patent Number: 5,656,210
[45] Date of Patent: Aug. 12, 1997

[54] REACTION INJECTION MOLDING AS A PROCESS TO PREPARE CONTACT LENSES

[75] Inventors: Gregory A. Hill, Ponte Vedra Beach, Fla.; Kurt C. Frisch, Grosse Ile, Mich.; Vahid Sendijarevic, Troy, Mich.; Shaio-Wen Wong, St. Clair Shores, Mich.

[73] Assignee: Johnson & Johnson Vision Products, Inc., Jacksonville, Fla.

[21] Appl. No.: 415,000

[22] Filed: Mar. 31, 1995

[51] Int. Cl.$^6$ .................................................. B29D 11/00
[52] U.S. Cl. ...................... 264/2.6; 264/328.6; 523/106; 525/903
[58] Field of Search ................... 264/2.6, 1.7, 328.6; 523/106; 525/903

[56] References Cited

U.S. PATENT DOCUMENTS

| | | |
|---|---|---|
| 3,503,942 | 3/1970 | Seiderman . |
| 4,254,065 | 3/1981 | Ratkowski . |
| 4,359,558 | 11/1982 | Gould et al. . |
| 4,408,023 | 10/1983 | Gould et al. . |
| 4,430,458 | 2/1984 | Tighe et al. . |
| 4,454,309 | 6/1984 | Gould et al. . |
| 4,496,535 | 1/1985 | Gould et al. . |
| 4,536,554 | 8/1985 | Lim et al. . |
| 4,644,033 | 2/1987 | Gnanou et al. . |
| 4,780,488 | 10/1988 | Su et al. . |
| 4,786,657 | 11/1988 | Hammar et al. . |
| 4,857,606 | 8/1989 | Su et al. . |
| 4,859,780 | 8/1989 | Molock et al. . |
| 4,923,666 | 5/1990 | Yamazaki et al. . |
| 4,931,521 | 6/1990 | Matsuda et al. . |
| 4,983,702 | 1/1991 | Mueller et al. . |
| 5,039,769 | 8/1991 | Molock et al. . |
| 5,087,392 | 2/1992 | Burke et al. . |
| 5,170,192 | 12/1992 | Pettigrew et al. . |
| 5,356,946 | 10/1994 | Mafoti et al. . |

FOREIGN PATENT DOCUMENTS 0 330 615  8/1989  European Pat. Off. .

OTHER PUBLICATIONS

Doo Sung Lee and Sung Chul Kim, *Macromolecules* 1984, vol.17, pp. 268–271.

L.T. Manzione, Encyclopedia of Polymer Science and Engineering, vol. 14 (1985), pp. 72–100.

H.X. Xiao et al., Journal of Polymer Science: Polymer Chemistry Edition, vol. 21, pp. 2547–2557 (1983).

D. Klempner et al., Encyclopedia of Polymer Science and Engineering, vol. 8 (1985) pp. 279–341.

*Primary Examiner*—Mathieu D. Vargot

[57] ABSTRACT

The present process is directed to using a reaction injection molding process to make contact lenses made up of an interpenetrating polymer network of polyurea and polyacrylic by the reaction injection molding process.

29 Claims, 1 Drawing Sheet

REACTION INJECTION MOLDING AS A PROCESS TO PREPARE CONTACT LENSES

BACKGROUND OF THE INVENTION

1. Field of the Invention

The present invention relates to a process for preparing contact lenses made up of an interpenetrating polymer network (IPN) of polyurea and polyacrylic by the reaction injection molding process.

2. Discussion of the Prior Art

Contact lenses are precision ophthalmic devices. The manufacture of contact lenses requires the ability to produce a device with two curved surfaces to a radius of curvature with an accuracy of better than ten microns. The surfaces must be of optical quality, and the lens edges must be smooth with minimal defects.

With a growing preference for contact lenses as corrective ophthalmic devices, and the introduction of wearing modes requiring frequent replacement of such lenses, there exists a real need for a cost-effective, high speed process of manufacturing high quality precision lenses.

Historically, contact lenses have been prepared from polyhydroxyethylmethacrylate (PHEMA). Three manufacturing processes have generally been utilized: lathing, spin-casting and cast molding. Unfortunately, each of these processes has its disadvantages associated with it which prevent it from producing high precision ophthalmic devices in an efficient and quick manner.

Lathing is slow and lacks precision for high speed production. Typically, a lens is manufactured to the best specifications. The parameters are determined for the finished lens. The finished lens is then "slotted" to its closest power and packaged for sale. However, the process of lathing is inadequate to meet the demands of high speed high volume production.

The technique of spin casting is capable of producing precision lenses. A liquid monomer containing cross-linking agents is injected into the concave cavity of a precision plastic mold, and the mold is spun at a predetermined rate. The resulting centrifugal force causes the liquid monomer to spread over the surface of the concave mold in the shape of a contact lens. The centrifugal force is modulated by the spinning rate of the plastic mold. Thus, by adjusting the spinning rate of the mold, contact lenses with precise thickness and prescription can be manufactured. The spin cast lens, thus prepared, requires that the edges be polished prior to hydration and released from the mold.

More specifically, in the spin-casting technique, the front surface of the contact lens is shaped by the mold, while the back surface is shaped by the free spinning of the mold. The centrifugal force generated by the spinning mold often produces spherical base curves in the back surface of the contact lens. The nature of these base curves can affect the optical quality and fitting of the finished lenses. While the technique of spin casting is capable of producing precision lenses, it is inadequate to meet the combined demands of high speed and cost-effective production.

Cast molding is an increasingly used manufacturing process for rigid gas permeable lens like siloxane rubbers, and for soft hydrogel contact lenses made from poly(hydroxy ethyl methacrylate). It is, thus far, the most successful high speed, high precision process for making contact lenses. It is a closed molding process. Cast molding requires the use of two molds with an annular contact, wherein the molds used are derived from a variety of plastics.

In cast molding, a female mold forms the lens' convex front surface, while a male mold forms the lens' concave back surface. The liquid monomer is placed in the cavity and sealed by the annular contact between the two molds. Polymerization occurs in the closed cavity, and the polymerized hardened lens is released from the mated molds. The subsequent processing of the lens is similar to the methods used for producing lens by spin casting.

Lenses produced by cast molding have a number of defects resulting from shrinkage due to polymerization. The negative entropy accompanying polymerization reactions leads to a reduction in the volume of the polymer, as compared to the volume of the starting monomer. This shrinkage in volume occurs inside the closed cavity of the two mated molds used in this process. The resulting lens frequently has surface voids and edge irregularities resulting in a higher than ideal fraction of unusable lenses. Various methods have been used to attempt to eliminate the shrinkage defects. For example, in U.S. Pat. No. 4,640,480, the molds are modified to ameliorate such shrinkage defects. Another technique is to use a diluent to mitigate the shrinkage effect during polymerization.

It is clear from the above discussion that there exists a real need for a contact lens manufacturing process that meets the combined objectives of cost-effectiveness, high speed production and high quality precision and minimizes the effects of shrinkage on the lens. In order to overcome the inadequacies of these various techniques, investigations have been made into the use of different materials for the preparation of contact lens. Considerable attention has been given to the modification of polymer properties through the use of procedures involving the formation of an interpenetrating polymer network (IPN).

An interpenetrating polymer network (IPN) is defined as an intimate combination of two or more polymers, both in network form, at least one of which is synthesized or cross-linked in the immediate presence of the other. In such a simultaneous synthesis, monomers of two or more different polymers are cross-linked and polymerized by non-interfering mechanisms. The crosslinking of at least one of the polymer systems distinguishes an IPN from a chemical blend. Such a physical combination of two or more structurally dissimilar polymers provides a convenient way of combining the different properties of individual polymers. A comprehensive review of Interpenetrating Polymer Networks is described in Vol. 8, Encyclopedia of Polymer Science and Engineering, pp 279–341 (1985), the contents of which are incorporated by reference. Current developmental efforts in IPN materials for contact lenses strive to combine the excellent mechanical properties of hydrophobic polymers with the soft, wettable and oxygen permeable properties of hydrophilic polymers.

Liu for example, in U.S. Pat. No. 4,618,644 describes the polymerization of methyl methacrylate in the presence of a silicone polymer to obtain a product of improved toughness. The polymerization of hydroxyethyl methacrylate in the presence of ethylene glycol dimethacrylate and a cross-linkable poly (dimethylsiloxane) to yield a product stated to be useful for the fabrication of contact lenses is described by Falcetta (Ger. Offen. DE 2,518,904). Contact lenses have also been fabricated from the interpenetrating network polymer resulting from the polymerization of 2-hydroxyethyl methacrylate in the presence of poly-N-vinylpyrrolidone (Ewell, U.S. Pat. No. 3,647,736).

Neefe (U.S. Pat. No. 4,632,773) shows the polymerization of methyl methacrylate in the presence of a syrup containing polymerized methacryloxypropyl-trimethoxysilane and a fluorescent colored pigment to obtain a solid contact lens blank material which can be readily identified. Tighe and Gee (U.S. Pat. No. 4,430,458) disclose the formation of a soft contact lens material by the cross-linking of a polymeric hydrogel of a copolymer of N-vinyl-2-pyrrolidone during the final compression of injection molding process. Lim et al. (U.S. Pat. No. 4,536,554) describe the preparation of soft contact lenses made from the interpenetrating network polymer obtained by the polymerization of a mixture containing a hydrophilic and a hydrophobic monomer and at least two cross-linking agents.

But, even with the use of IPN networks in making contact lenses, the aforementioned techniques have been utilized. For example, cast molding has been utilized in U.S. Pat. No. 5,170,192 to Pettigrew et al. to prepare the bifocal contact lenses therein and to prepare the contact lenses described in U.S. Pat. No. 5,087,392 to Burke, et al.

Although the use of IPN's may improve the shrinking effect, it still has not overcome the problem completely. Moreover, the use of IPN's heretofore has not significantly reduced the manufacturing time for making the contact lens. For example, in U.S. Pat. No. 4,536,554 to Lim, et al., the copolymerization to form an IPN from vinyl pyrrolidone and 5-alkylene-m-dioxanyl acrylic ester took at least 6–8 hours.

Thus, there is still an unfilled need in the optical industry to prepare contact lenses that minimizes or substantially eliminates the shrinkage effects, and that manufactures contact lenses in a simple and economical procedure. It is towards this need that the present invention is directed.

The present inventors have found a solution that addresses this need. The present invention uses a Reaction Injection Molding (RIM) process to manufacture precision contact lenses.

The RIM process has been utilized in plastics technology and especially in the automotive industry especially in the manufacturing of bumpers and dashboards, but until the present invention, has never been utilized to prepare precision contact lenses. The general technique of utilizing the RIM process is described in an article by L. T. Manzione, in 14 Encyclopedia of Polymer Science and Technology, pp 74–100, the contents of which are incorporated herein by reference.

The RIM process is a polymer process operation wherein reactive low viscosity liquid components are mixed, typically by impingement, injected into a mold and polymerized therein to form a polymer article. A schematic of a typical RIM process is shown in FIGS. 1 and 2 for a two stream process. Typically, the RIM process proceeds as follows:

Referring to FIG. 1, the monomers (1) are stored in separate reservoirs or tanks (14), usually under nitrogen or dry air blankets (9). These tanks are jacketed and equipped with stirrers (2) in order to maintain the monomers at a specified temperature range. The monomers are in the liquid state in these tanks.

A predetermined and precise amount of each liquid component is drawn from each tank through an inlet line (4) with a metering cylinder or pump (5) and delivered to the mixing chamber, the mixhead (7), at high pressure through connecting means (10). A recirculation line (6) connects the mixhead with the storage tank line (3) through which excess material can be returned to the reservoir.

The high pressure is required to attain material velocity and turbulence sufficiently high to cause thorough mixing of the two monomers.

Before entering the mixhead, wherein the monomers meet, they pass through small apertures in the side wall of the mixing chamber. In a typical mixhead, the mixing chamber is created by the pullback of a rod (15), creating a cylindrical cavity. The orifices impinge the high pressure fluid streams at 180° angle, frequently in the rear portion of the cavity. The rod is activated, at the conclusion of the impingement, and moves forward to push the reacting fluid from the chamber into a mold cavity (8), which is attached to the mixhead (see FIG. 2). The reactive material passes through a gate (13) into the mold wherein the polymerization is completed. Typically, to prevent trapping of air inside the mold, the mold contains a vent (12) which passes from the mold wall (11) to the mold cavity (8).

The present inventors have found a means of utilizing this RIM process for the manufacture of contact lenses from IPN material. This methodology is fast and efficient and is quite suitable for high speed production. Moreover, the RIM process has the capability to reduce or eliminate shrinkage related defects in contact lenses. It permits the use of IPN's for the preparation of hydrogels suitable for contact lenses which have properties that are not achievable either from acrylic polymers or urethane polymers separately.

SUMMARY OF THE PRESENT INVENTION

Accordingly, the present invention is directed to the process for preparing a contact lens comprising (a) mixing a reactive mixture in a RIM machine under conditions sufficient to initially form a mixture of precursors for polyurea and polyacrylic networks which upon curing forms an interpenetrating polymer network, said reactive mixture comprising:

(i) an amine terminated chain extender comprising a mixture of amines A and B, said amines being present in about 20–60% by weight in said reactive mixture, wherein A is

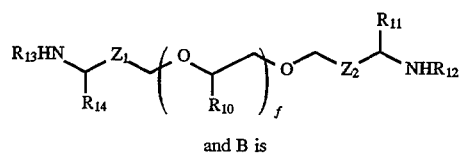

and B is $$H_2N-R-(O-R)_{f_1}-NH_2$$

wherein $f_1$ is an integer from 1–75;

R is an alkylene containing 3 carbon atoms and each R is the same;

f is an integer between 1 and 150, inclusive;

$R_{10}$, $R_{11}$, $R_{12}$, $R_{13}$ and $R_{14}$ are independently hydrogen or lower alkyl;

$Z_1$ and $Z_2$ are independently a chemical bond or lower alkylene;

with A and B being present in relative weight ratios ranging from 60/40 to about 100% A, (ii) an organic di or polyisocyanate present in sufficient quantities to react with said amine terminated chain extender of (i), (iii) an acrylic ester of the formula:

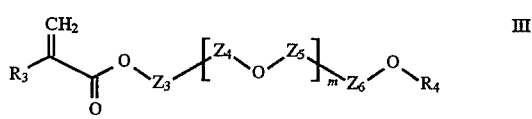

or

-continued

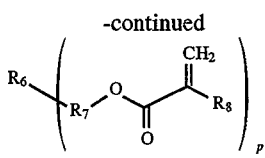

wherein m is an integer from 0 to 150;

$R_1$ is hydrogen or lower alkyl;

$Z_3$ and $Z_5$ are independently alkylene;

$Z_4$ and $Z_6$ are independently a chemical bond or lower alkylene;

$R_4$ is hydrogen, lower alkyl or

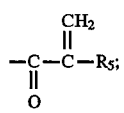

$R_5$ is hydrogen or lower alkyl;

$R_6$ and $R_8$ are lower alkyl;

$R_7$ is a lower alkylene, a chemical bond or $-CH_2(OCH_2CH_2)_q$;

q is an integer between 0 and 200, inclusive; and p is an integer of 1 to 3; said acrylic ester being present in about 10–50% by weight in said reactive mixture; and (iv) a free radical initiator being present in sufficient quantities to polymerize the acrylic ester of (iii), forming therefrom a polyacrylic network;

(v) a triamine present in sufficient amount to crosslink the amine terminated chain extender of (i), wherein the ratio of polyurea to polyacrylic ranges from about 90:10 to about 50:50;

(b) injecting said mixture of (a) into a closed mold in fluid communication with the RIM machine having a cavity defining the shape of a contact lens under curing conditions sufficient to gel and harden said liquid into an interpenetrating polymer network;

(c) removing the product of (b) from the mold;

(d) optionally post-curing the product of (c) and (e) immersing the product of (d) in a water or an aqueous medium until equilibrium is reached to form a contact lens in the form of a hydrogel.

DETAILED DESCRIPTION OF THE INVENTION

Figure 1:
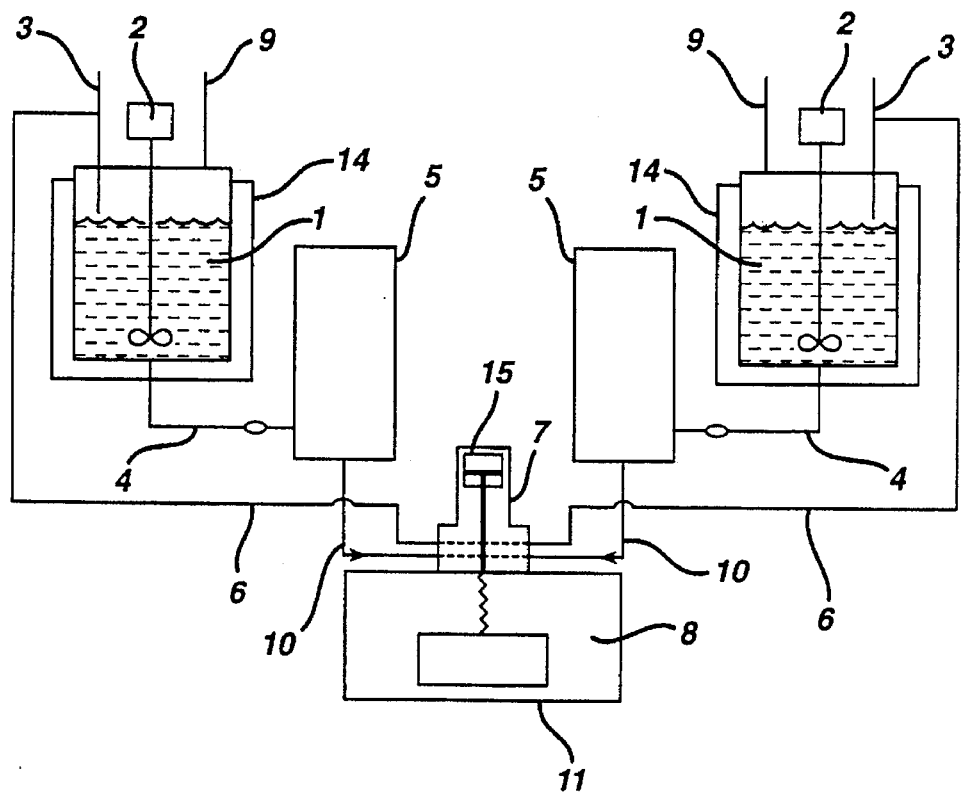
FIG. 1 is a typical schematic of the RIM process.
Figure 2:
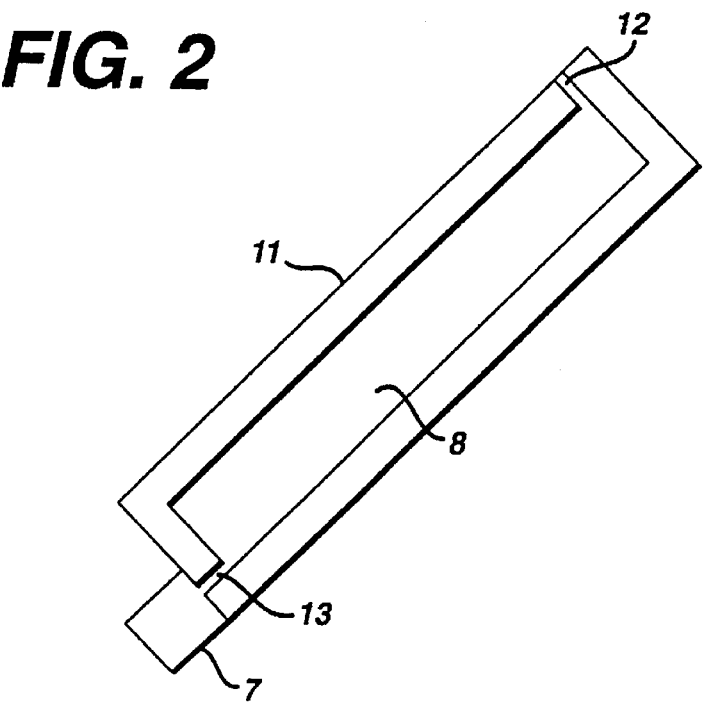
FIG. 2 is a schematic of a typical mold.

The interpenetrating polymer network prepared by the present invention comprised of polyurea and polyacrylic networks is described in co-pending application having Ser. No. 08/415,001, and entitled "Interpenetrating Polymer Network for Contact Lens Product", the contents of which are incorporated herein by reference. The IPN is completely homogeneous and exhibits a single glass transition temperature.

The polyurea network is a network that is formed from the spontaneous reaction of amines, i.e., an amine terminated chain extender, with organic di- or polyisocyanates in the presence of triamines.

The amines suitable for the present invention are polymers having two or more terminal amino functionalities or secondary amines or a combination of a terminal amine and a secondary amine. The most preferred amines are amino terminated polyethers. Examples of the amines include poly(oxyethylene) diamine, poly(oxypropylene) diamine, triethylene glycol diamine, and the like.

The amine component is comprised of a mixture of amines, a polyoxyethylene diamine and a polyoxypropylene diamine. It has been found by the present inventors that the balance of polyoxyethylene diamine and polyoxypropylene diamine is very important to the transparency and water absorption ability of the IPN elastomers. The presence of poly(oxyethylene) amines in the formulation is necessary to permit the hydrogel to absorb water. As the content and molecular weight of the polyoxyethylene amine increases, the resulting hydrogels absorb more water. Unfortunately, the transparency suffers as the poly(oxyethylene) amines tend to crystallize. The presence of poly(oxypropylene) amines in the formulation is necessary to obtain transparent hydrogels.

The poly(oxyethylene) amines used in the present invention have the formula:

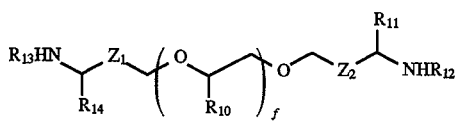

wherein $R_{13}$, $R_{14}$, $R_{10}$, $R_{11}$, $R_{12}$, f, $z_1$ and $z_2$ are as defined herein.

It is preferred that f is 30–70.

A preferred embodiment thereof has the formula:

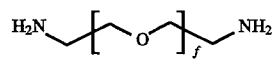

The poly(oxypropylene) amine used herein preferably is of the formula:

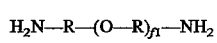

wherein R is an alkylene chain containing 3 carbon atoms and each R is the same and $f_1$ is an integer of 1–50. The preferred R is isopropylene and the preferred values of $f_1$ is 1–30 and f is 30–70.

In the preferred embodiment of the present invention, the mixture of amines preferably comprises a poly(oxyethylene) diamine of the formula I:

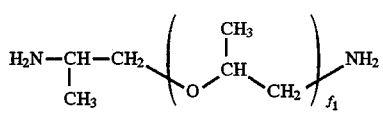

wherein f is an integer of 30–70 and a poly(oxypropylene) diamine of the formula 1B:

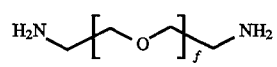

wherein $f_1$ is an integer of 1–30.

It is preferred that the amine be present in about 20–60% by weight in the starting monomeric mixture. The preferred relative weight ratio of IA and IB range from about 60/40 to about 100% A, respectively.

It is to be noted that unless indicated to the contrary, the percentages and ratios herein are by weight.

The organic di or polyisocyanates used to form the polyurea network of the present invention are represented by the formula Q(NCO)$_t$ wherein t is preferably 1–4 and Q is an hydrocarbyl group, i.e., an organic radical consisting solely of carbon atoms and hydrogen atoms. Q may be aliphatic, alicyclic, aromatic, or combination of any of these groups, such as aliphatic-aromatic group, aliphatic-alicyclic group, and the like. The Q group may be unsubstituted or substituted with lower alkyl, hydroxy, lower alkoxy. It is preferred that the isocyanate is aliphatic. In a preferred embodiment, it is preferred that Q contains from 3–26 carbon and more preferably from 4–20 carbon atoms and most preferably from 6 to 14 carbon atoms. In the above formula, t is an integer greater than 1 and preferably 2–4. Representative examples of the isocyanates include tetramethylene diisocyanate; hexamethylene diisocyanate; trimethylhexamethylene diisocyanate; dimer acid diisocyanate; isophorone diisocyanate; diethylbenzene diisocyanate; decamethylene 1,10-diisocyanate; cyclohexylene 1,2-diisocyanate, cyclohexylene 1,4-diisocyanate, 2,4- and 2–6 tolylene diisocyanate; 4,4-diphenylmethane diisocyanate; 1,5-naphthalene diisocyanate; dianisidine diisocyanate; toluidine diisocyanate; 4,4' methylene-bis (cyclohexylisocyanate), neopentyltetraisocyanate, mxylylene diisocyanate, tetrahydronapthalene-1,5-diisocyanate and bis-(4-isocyanatophenyl) methane; and the like.

The most preferred isocyanate is 4,4' methylene- bis (cyclohexylisocyanate). Other preferred isocyanates are trimethyl hexamethylene diisocyanate and isophorone diisocyanate.

The isocyanates utilized in the present invention react with the amines to form the polyurea network. The isocyanates are present in such amounts as to react with the amines present. In the preferred embodiment the diisocyanate is present in 15–50% by weight of the starting monomeric mixture, and preferably in the amount of 25–40% by weight.

The reaction of the isocyanate with the amine is spontaneous, and thus no catalyst is needed for the polyurea formation. Moreover, the reaction is exothermic. The heat generated from the amine-isocyanate reaction can accelerate the free radical initiated polymerization of the acrylate, the other network of the interpenetrating network polymer prepared by the present invention.

The other network is comprised of an acrylic ester. The acrylic esters suitable for the present invention are polymerizable polyacrylate derivatives of polyhydric alcohols.

The acrylic esters are the ester derivatives of acrylic acid of the following formula:

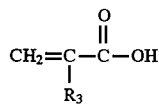

wherein R$_3$ is hydrogen or lower alkyl. It is to be noted when R$_3$ is methyl, the acid is methacrylic acid.

Monohydric alcohols and polyhydric alcohols having a molecular weight of less than 7,000 daltons and being amenable to esterification using the acrylic acids described hereinabove are suitable for use in the present invention. Preferred alcohols include monomethoxypolyethylene glycol, ethoxyethylene glycol, ethylene glycol, diethylene glycol, triethylene glycol, poly(oxyethylene) glycol, poly (oxypropylene) glycol, poly(oxypropylene)-triol, glycerol, trimethylol ethane, trimethylol propane, 1,4-cyclohexane diol, pentaerythritol and the like.

Since the polyhydric alcohols contain more than one hydroxy group, more than one acrylic unit can esterify to the polyhydric alcohols. Thus, acrylic esters of the present invention include mono-,di-, and polyacrylate derivatives of the alcohols described hereinabove, especially methacrylate derivatives thereof.

The acrylic esters useful in the present invention are of formulae III or IV:

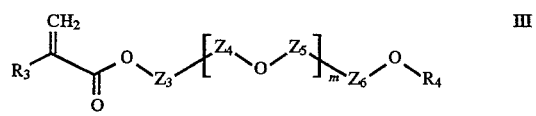

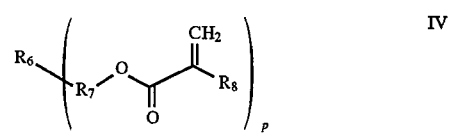

wherein

R$_3$ is as defined hereinabove;

m is an integer from 0 to 50;

Z$_3$ and Z$_5$ are independently lower alkylene;

Z$_4$ and Z$_6$ are independently a chemical bond or lower alkylene;

Z$_4$ is hydrogen, lower alkyl or

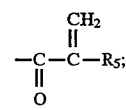

R$_5$ is hydrogen or lower alkyl;

R$_6$ and R$_8$ are lower alkyl;

p is an integer of 1 to 3;

R$_7$ is a lower alkylene a chemical bond or CH$_2$(OCH$_2$)$_q$; and q is an integer of 0 to 200, inclusive.

As used herein, the term lower alkyl when used alone or in combination with other groups refers to an alkyl chain containing 1–6 carbon atoms. The alkyl groups may be straight chained or branched. Examples include methyl, ethyl, propyl, isopropyl, butyl, sec-butyl, t-butyl, isobutyl, pentyl, isopentyl, neopentyl, hexyl, and the like. It is preferred that the alkyl group contains 1–3 carbon atoms.

As used herein, the term alkylene refers to a hydrocarbyl group derived from an alkyl group by dropping a hydrogen from the formula. The alkylene is bonded to two other groups in the main chain. Examples include: —CH$_2$—, —CH$_2$—CH$_2$—, —CH$_2$—CH$_2$—CH$_2$—,

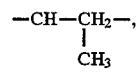

and the like. It is preferred that the alkylene groups contain 1–3 carbon atoms.

It is most preferred that R$_3$, R$_5$ and R$_8$ are alkyl having 1–3 carbon atoms, especially methyl.

Preferred values of R$_6$ and R$_8$ are lower alkyl having 1–3 carbon atoms. Preferred R$_6$ is ethyl and preferred R$_8$ is methyl. It is preferred that R$_7$ is methylene.

Preferred values of R$_4$ are hydrogen, lower alkyl having 1–3 carbon atoms, and $$-\underset{\underset{O}{\|}}{\overset{\overset{CH_2}{\|}}{C}}-C-R_5,$$

especially methacrylate.

It is preferred that m is 0 to 30, and especially 0 to 20.

Preferred values of $Z_4$ and $Z_6$ are independently chemical bonds and alkylene groups having 1–3 carbon atoms. It is preferred that $Z_3$ and $Z_5$ are independently alkylene groups containing 1–3 carbon atoms. It is also preferred that $Z_3$ is the same as $Z_6$, and $Z_4$ is the same as $Z_5$.

Preferred values of q are 0 to 100, more preferably 0 to 50 and most preferably 0 to 25.

A preferred embodiment of Formula III has formula IIIA:

$$R_3 \underset{\underset{O}{\|}}{\overset{\overset{CH_2}{\|}}{C}}-C-O-[-O-]_m-O-R_4 \quad \text{IIIA}$$

wherein m, $R_3$, and $R_4$ are as defined hereinabove. It is preferred that $R_4$ is hydrogen or lower alkyl, $R_3$ is lower alkyl, especially methyl and m is 0–20.

Another preferred acrylate monomer of Formula III is the diacrylate of the formula:

$$R_4 \overset{CH_2}{\underset{O}{\|}}C-O-[-O-]_n-O-C\overset{CH_2}{\underset{O}{\|}}R_5 \quad \text{IIIB}$$

wherein $R_9$ is hydrogen or lower alkyl and $R_5$ is as defined hereinabove, preferably methyl, and n is 0 to 30.

The acrylic esters are present in about 10 to about 50% by weight in the starting monomer mixture, and more preferably from about 15% to about 35% by weight.

It is preferred that the acrylic ester consists of a mixture of acrylic monomers. The first acrylic monomer is comprised of an acrylate of Formula IIIA, while the second acrylic monomer comprises a compound of Formula IIIB or IV, or mixtures thereof. The first and second acrylic monomers are present in relative weight ratios ranging from about 80/20 to about 95/5, respectively.

Examples of the acrylic monomers are methacrylates which include hydroxyethyl methyacrylate (HEMA) of the formula:

$$H_3C\overset{CH_2}{\underset{O}{\|}}C-O-OH$$

Another preferred monomethacrylate is poly (ethylene glycol) monomethacrylate having the formula:

$$H_3C\overset{CH_2}{\underset{O}{\|}}C-O-[-O-]_m-OH$$

wherein m is an integer from 0 to 20.

Another preferred monomethacrylate is a poly (propylene glycol) monomethacrylate having the formula:

$$H_3C\overset{CH_2}{\underset{O}{\|}}C-O-\left(-\underset{CH_3}{-}-O-\right)_m-OH$$

wherein m is an integer from 0 to 20.

A preferred dimethacrylate is poly (ethylene glycol) dimethacrylate, having the formula:

$$H_3C\overset{CH_2}{\underset{O}{\|}}C-O-[-O-]_n-O-C\overset{CH_2}{\underset{O}{\|}}CH_3$$

wherein n is an integer from 0 to 20.

Another preferred dimethacrylate is poly (propylene glycol) dimethacrylate having the formula:

$$H_3C\overset{CH_2}{\underset{O}{\|}}C-O-\left(-\underset{CH_3}{-}-O-\right)_n-O-C\overset{CH_2}{\underset{O}{\|}}CH_3$$

wherein n is integer from 0 to 20.

A preferred trimethacrylate is trimethylol propane trimethacrylate having the formula:

$$CH_3-CH_2-\left(-O-C(=O)-C(CH_3)=CH_2\right)_3$$

To form the acrylic network, the acrylic esters described hereinabove are reacted with a free radical initiator under polymerization conditions. Free radical polymerization initiators of the type commonly used in polymerizing ethylene compounds are suitable for use in the present invention. They include such representative initiators as benzoyl peroxide, t-butyl hydroperoxide, t-butylperoxide, azo-bis (isobutyronitrile), 2, 5 dimethyl-2, 5-di(2-ethyl hexanoylperoxy) hexane, 1,1-di(t-butylperoxy) - 3,3,5-trimethylcyclohexane, di-t-butyl-diperoxyphthalate, peroxides, hydroperoxides, mixtures of peroxides and hydroperoxides (Lupersol DDM-9), 1,1'-azobis-(1-cyclohexanecarbonitrile), 2,2'-Azobis [2-(2-imidazolin-2-yl)propane] dihydrochloride, 2,2'-Azobis (2,4-dimethylvaleronitrile) 2,2' Azobis (4-methoxy-2, 4-dimethylvaleronitrile), and the like.

The free radical initiators are present in amounts ranging from greater than 0% to about 2% by weight of the reaction mixture, and preferably from 0.01% to about 1%, and more preferably from 0.02% to about 0.5%, and most preferably from 0.03% to about 0.1% of the mixture.

In addition, a triamine is present in the monomeric mix. The triamines are cross-linkers in the polyurea-acrylic IPNs. They also are used as compatibilizers in the polyamine mixture, especially if the RIM machine is not equipped with a mixing device. To ensure that the mixture of the polyoxyethylene diamine and the polyoxypropylene diamine remain homogeneous, it is preferred that the diamine mixture is constantly stirred. If the IPN is prepared in the absence of a stirring device, such as in some Mini-Rims, then a cross-linker, i.e., the triamine, is added to ensure the homogenity.

The triamines are present in amounts ranging from about 30 to about 50% of the total amine equivalents. It is preferred that the triamines be present in amounts ranging from 1% to about 20% by weight and more preferably from about 3–5% by weight. Examples of triamines include diethyltriamine, poly(oxypropylene) triamine and the like.

These reactive components, the polyamines, the isocyanates, the acrylic esters, the free radical initiator, the triamines are intimately mixed together initially in a typical reaction injection molding apparatus. The reservoirs and thus the streams of the reactant components are set up so that interfering side reactions, such as those leading to discolorations, precipitation and polymerization are eliminated.

At a minimum in the RIM process, at least two streams of reactive components are delivered to the mixhead from each reservoir containing the reactive components. In this embodiment containing two streams of components, a mixture of the polyamines is stored in one of the reservoirs, as a liquid. If the triamine cross-linking agent is present, it is also stored in this first reservoir, and together, both the polyamines and triamines are delivered to the mixhead as a first stream. A second reservoir contains a mixture comprising the acrylic esters, the isocyanate and the free radical initiator which mixture is delivered to the mixhead as a second stream of components. The materials in the reservoir should be maintained at temperatures that insure stability of the materials as well as maintenance of their fluidity. Thus, the reservoirs may be maintained at or near room temperature or be slightly heated. In a preferred embodiment of the two stream mixture, it is preferred that the first reservoir is slightly heated to temperatures of about 75°–100° C., and more preferably 80° C., while the second stream is maintained at room temperature. A precise and predetermined amount of liquid, in accordance with the amounts described hereinabove, is drawn from each tank with a metering cylinder or pump and is delivered to the mixhead compartment.

Of course, the RIM apparatus may be set up with more than two reservoirs and thus more than two streams of material can be delivered to the mixhead. Although as a theoretical matter, an infinite number of streams of reactive components are possible, as a practical matter, there should be no more than 8 streams and more preferably no more than 5 streams. Upon investigation, the amines appear to react with the other non-amino components. Thus, the amines should be stored in their own individual reservoirs or may be stored together in one reservoir. The other components, i.e., the acrylate, the isocyanate and the free radical initiator may be stored together or in individual reservoirs. Thus, an embodiment of the present inventions is a three stream system which comprises the amines as one stream, the acrylic esters as one stream and the free radical initiator and isocyanate as the third stream, while an embodiment of a four stream system comprises the amines as two separate streams, the acrylic ester as a third stream and the isocyanate mix with the free radical initiator as the fourth stream. It is important in the RIM process that the quantity of material to be dispensed from each stream be of similar quantity.

Regardless of the number of reservoirs, a predetermined amount of each component is removed from each reservoir and placed into the "stream" and delivered to the mixhead compartment, wherein the various streams meet. The various streams are impinged at the mixhead compartment at pressures sufficient to insure intimate contact and mixture of the reactive components. Typically, they are mixed by impingement at the mixhead at pressures ranging from about 400 to about 3000 psi, and more preferably from 1500 to about 3000 psi.

It is at the mixhead compartment wherein polymerization to form the IPNs of the present invention initially occurs. However, the polymerization is completed in the contact lens mold assembly, which is connected to the RIM by a runner channel which passes through a sprue into the lens mold assembly. The opening of the sprue is controlled by a gate, which opens and closes.

The polymerization is generally carried out at temperatures from about room temperature to about 145° C. It is generally preferred to initiate the polymerization at relatively low temperatures such from about 45° C. to 80° C. and then increase the temperature to about 110° to 130° C.

Usually, the polymerization is conducted under an inert nitrogen atmosphere in order to exclude the oxygen from the atmosphere which has the deteriorating effects on the formation of polymers of the present invention.

The contact lens mold assembly is in fluid communication with the mixhead and as indicated hereinabove, is connected to the RIM by connecting means which passes through a sprue into the lens mold assembly. The mold assembly (hereinafter used interchangeably with "mold") that is used is one that is typically used in preparing contact lens. In a preferred embodiment, the mold assembly comprises two mold halves useful in the production of a contact lens (i.e., a lens having ready to wear dimensions or a lens needing to be swelled (hydrated) to its final ready to wear dimension). Each mold half has a central curved section defining a concave surface, a convex surface and having the reduced dimensions (i.e., for an unswelled lens, 12.7 mm in diameter versus 14.0–14.4 m for a swelled lens) of the front or back curve, respectively of a contact lens produced in the mold assembly, said mold assembly having an annular flange integral with and surrounding said circular circumferential edge and extending therefrom in a plane normal to the axis of said concave surface. When preparing the contact lens, the two mold halves are held together by connecting means, such as a clamp, spring or bolt to form a mold assembly, said mold assembly comprising a front mold half and a back mold half in contact therewith, thereby defining and enclosing a cavity therebetween. It is the concave surface of the front mold half which has the curvature of the front curve of the contact lens to be produced in said mold assembly and is sufficiently smooth so that the surface of a contact lens formed by the polymerization of the IPN in contact with said surface is optically acceptable. It is the convex surface of the back mold half which has the curvature of the back curve of the contact lens to be produced in said mold assembly and is sufficiently smooth so that the surface of the contact lens formed by the polymerization of the IPN in contact with said surface is optically acceptable.

The mold material is made of glass, stainless steel, aluminum or other material commonly employed as molds for contact lenses; it is preferred that the mold material be aluminum or stainless steel; especially polished stainless steel.

As described hereinabove, the mold assembly has a central cavity in the shape of contact lens. The cavity may have variable thickness as required to provide the correct dioptric power. The variable thickness may be calculated using optical formulas familiar to those skilled in the art. The central thickness of the cavity ranges from about 0.00039 to 0.0118 inches.

It also contains a central sprue, which opening connects the mold to the RIM machine and through which a runner channel connecting the RIM machine and the mold assembly passes. The mold assembly also contains a plurality of vent apertures, positioned at various points on the surface of the mold assembly and extending through the cavity. As described hereinbelow, the vent serves to release excess reacting liquid and to permit the advancing flow of liquid polymerizing material to expel ambient atmosphere from the mold.

In a preferred embodiment of the present invention, the mold assembly has a central sprue and a symmetrical mold cavity of thickness of about 0.00039 to 0.0118 inches and more preferably about 0.0018 to about 0.0039 inches. The mold contains vent lines, located at each of the four mold edges.

In another embodiment, the mold cavity possesses a dual thickness cavity, wherein the cavity thickness varies form 0.004 inches to 0.032 inches.

In still another embodiment, the mold assembly consists of a mold cavity machined into one surface of the mold opposite to the sprue. It contains vent lines within a few inches, such as 4–6 inches, of the sprue. Such vents in the mold permit the air to escape from the cavity before the material can harden, thereby eliminating any entrapment of air in the lens.

It will be clear to those skilled in the art that other modifications in the mold assembly and mold can be utilized, and these other modifications are within the scope of the present invention.

As indicated hereinabove, the polymerization is initiated at the mixhead compartment. The pressure of injection forces the resulting liquid product, a low viscosity reacting liquid, through the runner system across the mold cavity until eventually the mold is filled with the initially polymerized product. Polymerization continues in the mold, where it is completed and the solid interpenetrating polymer network is formed.

Without wishing to be bound, it is believed that the location of the vents affects the ability of the present process to reduce or eliminate shrinkage related defects. More specifically, the first injected material will gel at a point in the mold after the cavity, i.e., in the vents. When the material gels, it will no longer flow. This creates a back pressure in the cavity. As the material in the cavity reacts, its volume decreases, thereby reducing the pressure in the cavity. Additional material is forced into the cavity filling the voids, thereby, reducing shrinkage related defects.

It is also believed that there is an additional mechanism taking place. Without wishing to be bound, it is believed that this mechanism is active in the RIM process. Because reaction begins at the moment of injection, a substantial fraction of the material has reacted before it reaches the cavity. Therefore, only a small amount of residual shrinkage occurs in the cavity.

The RIM process also reduces shrinkage related edge defects. Without wishing to be bound, it is believed that the edges of the ocular lens may be formed in a positive manner by the closing of the optical cavity by an annular moveable gate. The timing of the closing of the gate may allow edge formation after a substantial portion of the shrinkage has occurred, thereby reducing shrinkage related edge defects.

After the polymerization process is completed, the two halves of the mold are separated during a demolding step. The mold is opened by prying means, either manually or utilizing an instrument, and the IPN film is removed. External mold release agents, especially water-soluble mold release agents known in the art, may be utilized. Examples include such mold release agents as Frekote or Hysol Ac 4368, which may be applied to the surface of the mold to facilitate demolding. Alternatively, the inner surface of the mold may be lined with polyethylene. The polyethylene film is easily removed from the mold surface following injection of the molded elastomers. To help facilitate the release even further, the mold containing the polyethylene film is slightly heated to temperatures of 50°–70° C.

Another demolding process utilizes water, wherein it is incorporated as an inert diluent into the acrylic monomer stream at an effective concentration for demolding to occur at temperatures between 50° C.–70° C. inclusive. It is preferred that the water be present at a concentration of about 3 to about 7 weight percent and more preferably about 5 weight percent.

The demolded IPN film may be post-cured by heating the film (lens) at temperatures ranging from about 60° C. to about 125° C., and more preferably from about 75° C. to about 110° C. and most preferably at 100° C. to complete the polymerization.

Finally, the shaped IPN film is immersed in water or an aqueous medium, such as saline solution, until equilibrium is achieved. When swollen in the water or aqueous medium, the polymeric materials are in the form of hydrogels which are particularly suitable for use in making extended wear contact lenses. The water content of the hydrogel is greater than or about 30% by weight (water content is measured as weight of water based on weight of hydrogel).

The process of the invention makes possible the preparation of high quality contact lenses by a novel, simple economical procedure which avoids difficulties encountered in prior art procedures. The RIM process has the capability to reduce and eliminate shrinkage related defects in the contact lens. It also is fast and efficient and economical. As described above, a low viscosity liquid is injected into the mold. Thus, a lower pressure molding machine is suitable for the operation. Also, less expensive molds are required because of the lower pressure requirements. The use of smaller machines and less expensive molds result in lower costs. The present process also allows the use of IPN's for the preparation of hydrogels suitable for contact lens of the highest qualities and which is not achievable alone by its constituent parts, the acrylic polymers or urethane polymers separately.

The contact lens produced by this process has outstanding physical properties. It has high tensile and shear strength, and exhibits excellent mechanical properties. It has high wettability and high permeability to oxygen. The contact lens produced by this process permits visible light transmittance therethrough. The contact lens produced by this method is homogenous which is confirmed by the single glass transition temperature exhibited by the contact lens material of the present invention.

The following examples will serve to illustrate the principles and scope of the present invention.

In the following examples, various abbreviations are utilized. The table below contains the abbreviations to which reference is made in the examples.

| CODE | CHEMICAL NAME | MOL. WT. |
| --- | --- | --- |
| Jeffamine ED-900 | Poly(oxyethylene) diamine | 1179 |
| Jeffamine ED-2000 | Poly(oxyethylehe) diamine | 2277 |
| Jeffamine D-2000 | Poly(oxypropylene) diamine | 2000 |
| Jeffamine T-403 | Poly(oxypropylene) diamine | 440 |
| Jeffamine EDR148 | Triethylene glycol diamine | 148 |
| DETA | Diethylene triamine | 103 |
| Desmodur W | 4,4'-Methylene-bis-cyclohexyl-isocyanate, $H_{12}MDI$ | 262 |

-continued

| CODE | CHEMICAL NAME | MOL. WT. |
|---|---|---|
| HEMA | Hydroxyethyl methacrylate | 103 |
| PEGMA | Polyethylene glycol monomethacrylate | 306 |
| TEGDMA | Triethylene glycol dimethacrylate | 286 |
| PEG (600)DMA | Poly (ethylene glycol-600) dimethacrylate | 700 |
| L-256 | Lupersol-256 | |
| BPO | Benzoyl peroxide | 242 |

EXAMPLE 1

A blend was made of 589.5 parts ED-900, 400 parts D-2000, 155.4 parts EDR-148 and 34.3 parts DETA. This blend was called Stream 1. A second blend was made of 589.5 parts $H_{12}MDI$, 560.1 parts HEMA, 29.48 parts TEGDMA and 11.9 parts L-256. This blend was called Stream 2. The streams were placed in the material reservoirs of a two stream laboratory scale RIM machine. Stream 1 was heated to about 80° C. to maintain fluidity of the materials. Stream 2 was maintained at room temperature to insure stability of the materials. The streams were mixed by impingement at a pressure of 2500 psi. and injected into a two piece aluminum mold. The mixing ratio was 1.010 parts Stream 1 for each part of Stream 2. The injection time was 0.20 seconds. These conditions produced about 20 gm. of polymer in which both networks were separate and simultaneously produced.

The mold consisted of two aluminum plates. One of the plates was machined such that it had two compartments. One compartment was designed to produce a film 100 microns thick. The other compartment was designed to produce a film 800 microns thick. The mold was held together by bolts. The mold was heated to 100° C. in an external oven. When the mold reached 100° C., it was attached to the RIM machine. The material was post-cured in the mold for 10 minutes following the injection molding operation.

The mold was opened manually and the elastomeric film was removed from the mold. The demolded film was post-cured for one hour in an oven at 100° C. The film was converted to a hydrogel by immersion in a buffered saline solution.

The material produced was a clear IPN hydrogel of 75% (weight) urea component and 25% (weight) methacrylic portion. Following hydration, the material had the following properties:

| Water content | 34% |
|---|---|
| Modulus | 262 psi |
| Tensile strength | 300 psi |
| Elongation at break | 238% |

This material is suitable for use as a contact lens.

EXAMPLES II to V

A series of IPN elastomers were prepared using the methods of Example I. The formulations and properties are shown in Table II.

TABLE II

| EXAMPLE | II | III | IV | V |
|---|---|---|---|---|
| Stream 1 | | | | |
| ED-900 | 589.5 | 589.5 | 589.5 | 471.6 |
| ED-2000 | — | — | — | 227.9 |
| D-2000 | 200 | — | 400 | 400 |
| EDR-148 | 155.4 | 155.4 | 229.4 | — |
| DETA | 34.3 | 34.3 | — | 34.3 |
| Stream 2 | | | | |
| $H_{12}$ MDI | 563.3 | 537.1 | 589.5 | 1133.8 |
| HEMA | 483.6 | 412.68 | 566.9 | — |
| PEGMA | — | — | — | 454.0 |
| TEGDMA | 25.4 | 21.7 | 29.8 | 23.9 |
| L-256 | 10.2 | 8.7 | 11.9 | 9.6 |
| UREA/ACRYLIC RATIO | 75/25 | 75/25 | 75/25 | 75/25 |
| STREAM 1/STREAM 2 | 0.90 | 0.76 | 1.02 | 1.37 |
| Water content | 37.5 | 47.1 | 33.1 | 60.8 |
| Modulus (psi) | 218 | 87 | NA | 133 |
| Tensile strength (psi) | 263 | 101 | 110 | 81 |
| Elongation at break | 206 | 130 | 169 | 101 |
| Appearance | clear | opaque | hazy | clear |

The materials of Example II and Example V are suitable for contact lens use.

EXAMPLE VI

A blend was made of 471.6 parts ED-900, 228 parts ED-2000, 400 parts D-2000 and 34.3 parts DETA. This blend was called Stream 1. A second blend was made of 314.4 parts $H_{12}MDI$, 454.0 parts HEMA, 23.91 parts TEGDMA and 9.6 parts L-256. This blend was called Stream 2. The streams were placed in the material reservoirs of a two stream laboratory scale RIM machine. Stream 1 was heated to about 80° C. to maintain fluidity of the materials. Stream 2 was maintained at room temperature to insure stability of the materials. The streams were mixed by impingement at a pressure of 900 psi and injected into a two piece aluminum mold. The mixing ratio was 1.37 parts Stream 1 for each part of Stream 2. The injection time was 0.25 seconds. These conditions produced about 25 gm. of polymer in which both networks are separate and simultaneously produced.

The mold used for this example was described in Example 1.

The mold was opened manually within one minute of injection and the elastomeric film was removed from the mold. The demolded film was post cured for about 40 minutes in an oven at 100° C. The film was converted to a hydrogel by immersion in a buffered saline solution.

The material produced was a clear IPN hydrogel of 75% (weight) urea component and 25% (weight) methacrylic portion. Following hydration the material had the following properties:

| Water content | 50% |
|---|---|
| Modulus | 93 psi |
| Tensile strength | 91 psi |
| Elongation at break | 239% |

This material is suitable for use as a contact lens.

EXAMPLES VII TO IX

A series of IPN elastomers were prepared using the methods of Example VI. The formulations and properties are shown in Table III.

TABLE III

| EXAMPLE | VII | VIII | IX |
|---|---|---|---|
| Stream 1 | | | |
| ED-900 | 353.7 | 471.6 | 471.6 |
| ED-2000 | 227.9 | 455.8 | 455.8 |
| D-2000 | 400 | 200 | 200 |
| DETA | 34.3 | 34.3 | 34.3 |
| Stream 2 | | | |
| $H_{12}$MDI | 288.2 | 314.4 | 314.5 |
| HEMA | 408 | 463 | 463 |
| TEGDMA | 21.5 | 24.3 | 24.3 |
| L-256 | 8.6 | 19.4 | 9.8 |
| UREA/ACRYLIC RATIO | 75/25 | 75/25 | 75/25 |
| STREAM 1/STREAM 2 | 1.35 | 1.37 | 1.39 |
| Water content | 40.1 | 43.1 | 42.2 |
| Modulus (psi) | — | 254 | 245 |
| Tensile Strength (psi) | 141 | 292 | 221 |
| Elongation at break | 260 | 165 | 221 |
| Appearance | clear | clear | clear |

The materials of Examples VII, VIII and IX are suitable for contact lens use.

EXAMPLE X

A Hi-Tech three system RIM machine was used for this example. The machine was fitted with an Edge-Sweets four component mixhead. The mixing was by impingement.

The chemical system consisted of eight separate chemicals. The materials were blended as follows:

| Stream 1 | |
|---|---|
| 870.9 gm Jeffamine ED-900 | Poly(oxyethylene) diamine MW 1179 |
| 420.9 gm Jeffamine ED-2000 | Poly(oxyethylene) diamine MW 2277 |
| 738.7 gm Jeffamine D-2000 | Poly(oxypropylene) diamine MW 2000 |
| 63.5 gm DETA | Diethylene Triamine |

(Jeffamine is a trademark of the Texaco Chemical Company)

| Stream 2 | |
|---|---|
| 3502 gm HEMA | Hydroxyethyl Methacrylate |
| 72.4 gm TMPTMA | Trimethylolpropanetrimethacrylate |

| Stream 3 | |
|---|---|
| 3140 gm $H_{12}$MDI | 4,4'-methylene bis (cyclohexyl isocyanate) |
| 96.6 gm Benzoyl peroxide | |

The process conditions were:

| Stream | Pressure | Orifice | Flow Rate | Viscosity |
|---|---|---|---|---|
| 1 | 2700 psi | 0.75 mm | 99.3 gm/sec | 52 cps |
| 2 | 1900 psi | 1.25 mm | 42.30 gm/sec | 6 cps |
| 3 | 1900 psi | 0.50 mm | 28.4 gm/sec | 24 cps |

Stream 1 was split and injected in two separate ports. The ports were chosen to be 90° apart. This gave direct impingement of one-half the amine and the isocyanate streams.

The injection time was set at 0.03 sec. and a shot weight of 13.6 gm obtained.

The injection head of the RIM machine was affixed to a hardened steel mold. The mold had a channel 2 mm wide and 4 mm deep leading to a contact lens shaped cavity. The injection of the formulation into the mold produced a contact lens.

EXAMPLES XI, XII, XIII

Examples XI, XII, XIII were duplicates of Example X except that the flow rate of Stream 2 was changed to change the ratio of urea to acrylic fractions of the IPN's. The flow rates of Stream 1 and Stream 3 were adjusted to obtain a constant shot size. The orifice size was controlled to maintain the pressures of Example X.

| Example | | XI | XII | XIII |
|---|---|---|---|---|
| Stream 1 | Flow rate (gm/sec) | 104.0 | 78.3 | 92.8 |
| Stream 2 | Flow rate (gm/sec) | 33.2 | 66.7 | 50.8 |
| Stream 3 | Flow rate (gm/sec) | 29.7 | 22.4 | 26.5 |
| UREA/ACRYLIC RATIO | | 80/20 | 60/40 | 70/30 |

When these formulations were injected into a heated mold with a contact lens shaped cavity with an annular gate, a contact lens was formed.

EXAMPLES XIV, XV, XVI

Examples XIV, XV, XVI, were duplicates of Example XI, XII, and XIII except that the flat plate mold of Example I was used.

| Example | | XIV | XV | XVI |
|---|---|---|---|---|
| Stream 1 | Flow rate (gm/sec) | 120.2 | 78.3 | 92.8 |
| Stream 2 | Flow rate (gm/sec) | 38.4 | 66.7 | 50.8 |
| Stream 3 | Flow rate (gm/sec) | 34.4 | 22.4 | 26.5 |
| UREA/ACRYLIC RATIO | | 80/20 | 60/40 | 70/30 |

The resulting materials are useful as contact lenses.

The above preferred embodiments and examples are given to illustrate the scope and spirit of the present invention. These embodiments and examples will make apparent to those skilled in the art other embodiments and examples. These other embodiments and examples are within the contemplation of the present invention. Therefore, the present invention should be limited only by the appended claims.

What is claimed is:

1. A process for the preparation of a reaction injection molded contact lens comprising
   (a) mixing components in a reactive mixture in a RIM machine under sufficient conditions to form precursors for a polyurea network and a polyacrylic network, which upon curing forms on a interpenetrating polymer network, said reactive mixture comprising:
      (i) an amine terminated chain extender comprising a mixture of amines A and B, said amines being present in said reactive mixture in about 20–60% by weight, wherein A is

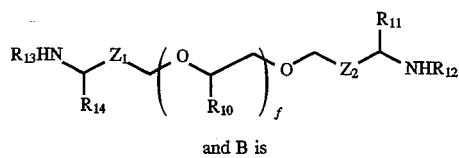

and B is

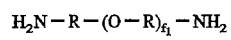

wherein $f_1$ is independently an integer from 1–75,
   R is an alkylene containing 3 carbon atoms and each R is the same, f is an integer between 1 and 150;

$R_{10}$, $R_{11}$, $R_{12}$, $R_{13}$ and $R_{14}$ are independently hydrogen or lower alkyl;

$Z_1$ and $Z_2$ are independently a chemical bond or lower alkylene, with A and B being present in relative weight ratios ranging from about 60/40 to about 100% A;

(ii) an organic di-or poly-isocyanate present in sufficient quantity to react with said amine terminated chain extender of (i) to form therefrom a polyurea network;

(iii) an acrylic ester of the formula:

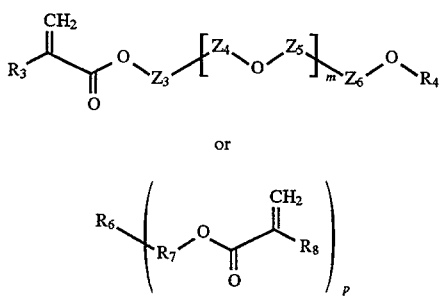

or

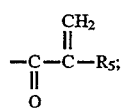

wherein $R_3$ is hydrogen or lower alkyl;

m is an integer from 0 to 150;

$Z_3$ and $Z_5$ are independently alkylene;

$Z_4$ and $Z_6$ are independently a chemical bond or alkylene;

$R_4$ is hydrogen, lower alkyl or $$-\overset{\overset{CH_2}{\|}}{C}-\overset{\|}{\underset{O}{C}}-R_5;$$

$R_5$ is hydrogen or lower alkyl;

$R_6$ and $R_8$ are independently hydrogen or lower alkyl;

$R_7$ is lower alkylene, a chemical bond or $-CH_2(OCH_2CH_2)_q-$;

q is an integer between 0 and 200, inclusive;

p is an integer of 1–3.

said acrylic ester being present in said reactive mixture in about 10–50% by weight;

(iv) a free radical initiator being present in said reactive mixture in sufficient quantity to polymerize the acrylic ester of (iii) forming therefrom a polyacrylic network; and (v) a triamine present in sufficient quantity to crosslink said amine terminated chain extender of (i) wherein the ratio of polyurea to polyacrylic ranges from about 90:10 to about 50:50, and the sum of the weights of the components in the reactive mixture adds to 100%;

(b) injecting said reactive mixture of (a) into a closed mold in fluid communication with the RIM machine and having a cavity in the shape of a contact lens under conditions sufficient to gel and harden said liquid into an interpenetrating polymer network;

(c) removing the product of (b) from the mold;

(d) optionally post-curing the product of (c) and (e) immersing the product of (d) in a water or an aqueous medium to form a hydrogel.

2. The process according to claim 1 wherein B is a polyoxypropylene diamine of the formula:

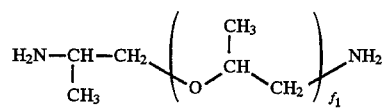

or

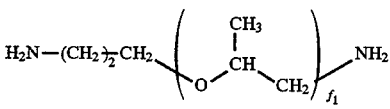

3. The process according to claim 1 wherein the triamine is present in an amount ranging from 30 to 50% total amine equivalents present in said mixture.

4. The process according to claim 3 wherein the triamine is diethylene triamine or poly(oxypropylene)triamine.

5. The process according to claim 1 wherein the isocyanate is methylene-bis (4,4'-cyclohexylisocyanate) or isophorone diisocyanate.

6. The process according to claim 1 wherein the free radical initiator is 2,5-dimethyl-2,5-di-(2-ethylhexanoyl peroxy) hexane, benzoyl peroxide, t-butyl hydroperoxide, t-butyl peroxide or lauryl peroxide.

7. The process according to claim 1 wherein the polyura/polyacrylic weight ratio is about 80:20 to about 70:30.

8. The process according to claim 1 wherein the polyurea/polyacrylic weight ratio is about 75:25.

9. The process according to claim 1 wherein the mold contains a plurality of vents.

10. The process according to claim 1 wherein the isocyanate is present in the reactive mixture in amounts ranging from about 15% to about 50% by weight.

11. The process according to claim 10 wherein the isocyanate is present in the reactive mixture in amounts ranging from about 25% to about 40% by weight.

12. The process according to claim 1 wherein the free radical initiator is present in amounts ranging from about 0.01% to about 1% by weight.

13. The process according to claim 1 wherein (a) the reactive mixture is mixed in a RIM machine at sufficient pressure to form precursors for a polyurea network and a polyacrylic network, which upon curing form an interpenetrating polymer network, said reactive mixture comprising (i) an amine terminated chain extender comprising a mixture of amines A and B, said amines being present in said reactive mixture in about 20–60% by weight, wherein A is

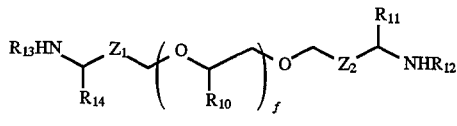

and B is

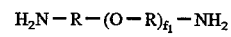

wherein $f_1$ is an integer from 1–75,

R is an alkylene containing 3 carbon atoms and each R is the same;

$R_{10}$, $R_{11}$, $R_{12}$, $R_{13}$ and $R_{14}$ are hydrogen or lower alkyl;

f is an integer between 1 and 150, inclusive;

$Z_1$ and $Z_2$ are independently a chemical bond or lower alkylene;

with A and B being present in relative weight ratios ranging from about 60:40 to about 100% A;

(ii) an organic di-or poly-isocyanate present in sufficient quantity to react with said amine terminated chain extender of (i) to form therefrom a polyurea network;

(iii) about 10–50% by weight in said reactive mixture of an acrylate ester component of a mixture of a first acrylate of the formula:

$$R_3-\underset{O}{\underset{\|}{C}}-\underset{\overset{\|}{CH_2}}{\phantom{C}}-O-[CH_2CH_2-O]_m-R_4$$

and a second acrylate being a diacrylate of the formula:

$$R_9-\underset{O}{\underset{\|}{C}}-\underset{\overset{\|}{CH_2}}{\phantom{C}}-O-[CH_2CH_2-O]_n-\underset{O}{\underset{\|}{C}}-\underset{\overset{\|}{CH_2}}{\phantom{C}}-R_5$$

a triacrylate of the formula:

$$R_6\left(R_7-O-\underset{O}{\underset{\|}{C}}-\underset{\overset{\|}{CH_2}}{\phantom{C}}-R_8\right)_p$$

or a mixture thereof, wherein $R_3$, $R_4$, $R_5$, $R_9$ and $R_8$ are independently hydrogen or lower alkyl;

$R_6$ is lower alkyl;

$R_7$ is a chemical bond or lower alkylene or $-CH_2(OCH_2CH_2)_q-$;

q is an integer between 0 to 200, inclusive;

m and n are independently integers of 0–150 and;

p is an integer of 1–3;

said ratio of the first acrylate to second acrylate ranges from about 80:20 to about 95:5;

(iv) a free radical initiator being present in said reactive mixture in sufficient quantity to polymerize the acrylic ester of (iii), forming therefrom a polyacrylic network, (v) a triamine present in sufficient quantity to crosslink said amine terminated chain extender, wherein the ratio of polyurea to polyacrylate ranges from about 90:10 to about 50:50;

(b) injecting said mixture of (a) into a closed mold in fluid communication with the RIM machine and having a cavity in the shape of a contact lens under conditions sufficient to gel and harden said liquid into an interpenetrating polymer network;

(c) removing the product of (b) from the mold;

(d) optionally post-curing the product of (c) and (e) immersing the material from (d) in a water or an aqueous medium to form a hydrogel.

14. The process of claim 13 wherein $R_3$, $R_4$, $R_5$ and $R_9$ are $CH_3$.

15. The process of claim 13 wherein $R_3$, $R_5$ and $R_9$ are $CH_3$, m is o, $R_4$ is hydrogen and n is 2.

16. The process of claim 13 wherein $R_3$, $R_9$ and $R_5$ are $CH_3$, m is 4, $R_4$ is hydrogen and n is 2.

17. The process of claim 13 wherein m is 4, $R_4$ is hydrogen, p is 3, $R_6$ is ethyl, $R_7$ is ethylene, and $R_3$ and $R_8$ are $CH_3$.

18. The process according to claim 13 wherein B is a polyoxypropylene diamine of the formula:

$$H_2N-\underset{\underset{CH_3}{|}}{CH}-CH_2-\left(O-\underset{\underset{}{|}}{\overset{CH_3}{\overset{|}{CH}}}-CH_2\right)_{f_1}-NH_2$$

or $$H_2N-(CH_2)_2-CH_2-\left(O-\overset{CH_3}{\overset{|}{CH}}-CH_2\right)_{f_1}-NH_2$$

19. The processing according to claim 13 wherein a triamine is present in the reactive mixture ranging from 30% to 50% of total amine equivalents.

20. The process according to claim 19 wherein the triamine is diethylene triamine or poly(oxypropylene)triamine.

21. The process according to claim 13 wherein the isocyanate is methylene-bis (4,4'-cyclohexylisocyanate) or isophorone diisocyanate.

22. The process according to claim 13 wherein the free radical initiator is 2,5-dimethyl-2,5-di-(2-ethylhexanoyl peroxy) hexane, benzoyl peroxide, t-butyl hydroperoxide, t-butyl peroxide or lauryl peroxide.

23. The process according to claim 13 wherein the polyurea polyacrylic weight ratio is about 75:25.

24. The process according to claim 13 wherein the mold contains a plurality of vents.

25. The process according to claim 13 wherein the isocyanate is present in the reactive mixture in amounts ranging from about 15% to about 50% by weight.

26. The process according to claim 13 wherein the isocyanate is present in the reactive mixture in amounts ranging from about 25% to about 40% by weight.

27. The process according to claim 13 wherein the free radical initiator is present in the reactive mixture in amounts ranging from about 0.01% to about 1% by weight.

28. The process according to claim 1 wherein water is additionally present in the reactive mixture.

29. The process according to claim 28 wherein water is present in a Concentration of about 3% to about 7% by weight.

* * * * *